United States Patent [19]
Rymer

[11] 4,188,700
[45] Feb. 19, 1980

[54] METHOD OF CONSTRUCTING AN ATTRITION MILL GRATE

[76] Inventor: Richard Rymer, 4128 E. Saxony Dr. SE., Grand Rapids, Mich. 49508

[21] Appl. No.: 909,509

[22] Filed: May 25, 1978

[51] Int. Cl.[2] .......... B23K 31/02

[52] U.S. Cl. .......... 29/163.5 R; 29/160; 228/158; 228/161; 228/182

[58] Field of Search .......... 228/155, 158, 161, 178, 228/182; 29/160, 163.5 R, 163.5 F

[56] References Cited

U.S. PATENT DOCUMENTS

| | | | |
|---|---|---|---|
| 414,767 | 11/1889 | Fox | 228/152 X |
| 3,276,108 | 10/1966 | White | 29/163.5 R |
| 3,514,833 | 6/1970 | Dunston | 228/182 X |
| 3,726,208 | 4/1973 | Brengman et al. | 241/74 X |
| 3,859,713 | 1/1975 | Fiedler | 29/163.5 CW |
| 4,045,853 | 9/1977 | White | 29/163.5 F |
| 4,069,979 | 1/1978 | Morita et al. | 241/284 X |

*Primary Examiner*—Francis S. Husar
*Assistant Examiner*—K. J. Ramsey
*Attorney, Agent, or Firm*—Glenn B. Morse

[57] ABSTRACT

The cylindrical rotating grate of an attrition mill is constructed by welding a group of bars in close spaced parallel relationship, and then rolling this assembly into a cylindrical configuration. The meeting ends of this configuration are then welded, and an opening is preferably cut from the rolled assembly. The area cut out in the process of forming the opening is used as a cover. The grate structure includes solid abutments interengageable with the cover to hold the cover in position against the large forces encountered during the operation of the mill, with relatively light securing means adapted to hold the cover in engagement with these abutments. A housing surrounding the rotating grate is provided with an opening through which the machine is charged with material, and this opening is covered by a curtain preferably provided with battens and a weight to hold it in position. A vacuum is applied to the interior housing for the removal of dust, which assists in holding the curtain in position.

4 Claims, 14 Drawing Figures

METHOD OF CONSTRUCTING AN ATTRITION MILL GRATE

BACKGROUND OF THE INVENTION

An attrition mill is essentially a machine in which a rotating perforate drum receives material that is to be pulverized. In some applications, steel balls or other metallic objects are incorporated along with the material charged into the machine to perform the pulverizing. The steel balls remain in the rotating drum, and the pulverized particles below a given size pass through the perforations in the drum and into some sort of container. When the charge of material is a mixture of metallic and non-metallic substances, it is often unnecessary to use special pulverizing objects. The metal components of the charge material tend to remain integral masses, which function to pulverize the non-metallic substances to the point that the resulting particle size will pass through the openings in the rotating drum or grate. The term "grate" is particularly appropriate for one relatively standard form of structure in which the cylindrical configuration is formed by a stack of axially-spaced circular bars held together by bolts or by welding. The usual procedure for constructing such a component is to roll the bars individually to a circular configuration, and then secure them with bolts to form the generally cylindrical grate. The spacing between these bars corresponds to the desired particle size which the machine is expected to discharge. This spacing will commonly be on the order of a sixteenth to an eighth of an inch. It is difficult, if not impossible, to maintain exact similarity between individually-rolled bars, and any deviations distort the uniformity of the active interior surface of the grate.

An attrition mill with a grate of two to three feet in diameter and perhaps three to four feet long can easily receive a charge of material that may contain solid of chunks of enough mass to generate tremendous forces as the drum rotates. It is usually most convenient to charge the rotating drum through a peripheral opening which is then closed by a cover. Obviously, this cover, and the structure securing it, are subject to the same degree of heavy pounding action that is delivered to the interior surface of the rest of the rotating grate. It has proven to be rather difficult to provide a sufficient security of the cover without generating problems with regard to the time required to remove the cover and re-install it. The operation of these machines is a purely commercial operation, and the time required to charge the machine and manipulate the cover represent periods in which the machine is out of productive operation. The present invention is directed at establishing a method for constructing the rotating grate in a much more efficient manner than previous practice, and to providing a grate structure that establishes adequate retention of a cover together with simplicity in removing and re-installing it.

SUMMARY OF THE INVENTION

The generally cylindrical grate component of an attrition machine is constructed by a novel method which assures geometrical similarity of the axially-spaced bars, and eliminates much of the problem of maintaining the coaxial alignment of these components. Initially straight bars are laid out in a group in side-by-side spaced relationship, and adjacent bars are welded at spaced positions along the lengths of the bars. This assembly is then rolled into a generally cylindrical configuration, and the meeting ends secured together. An opening is preferably cut in this configuration, and the material removed is used to form a cover. Structure is then added to secure the cover in position. The ends of the cylindrical configuration are closed, preferably with supporting shaft projections at the opposite ends. These are tubular, and can be used, at least on one side, as an exhaust duct.

The portions of the grate defining the cover opening are provided with beam flanges overhanging the adjacent grate portions to form a retention for the cover. A removeable bar is interposed between the cover and one of these flanges to secure the adjacent portion of the cover. A radially-extending portion of these marginal reinforcement beams at one side of the opening is provided with at least one peripheral stud interengaging with the bar to hold the cover in a position where the beam flanges can serve as retaining abutments against the heavy radial forces. A cross-pin traversing the stud secures this cover position.

DESCRIPTION OF THE PREFERRED EMBODIMENT AND METHOD

Figure 1:
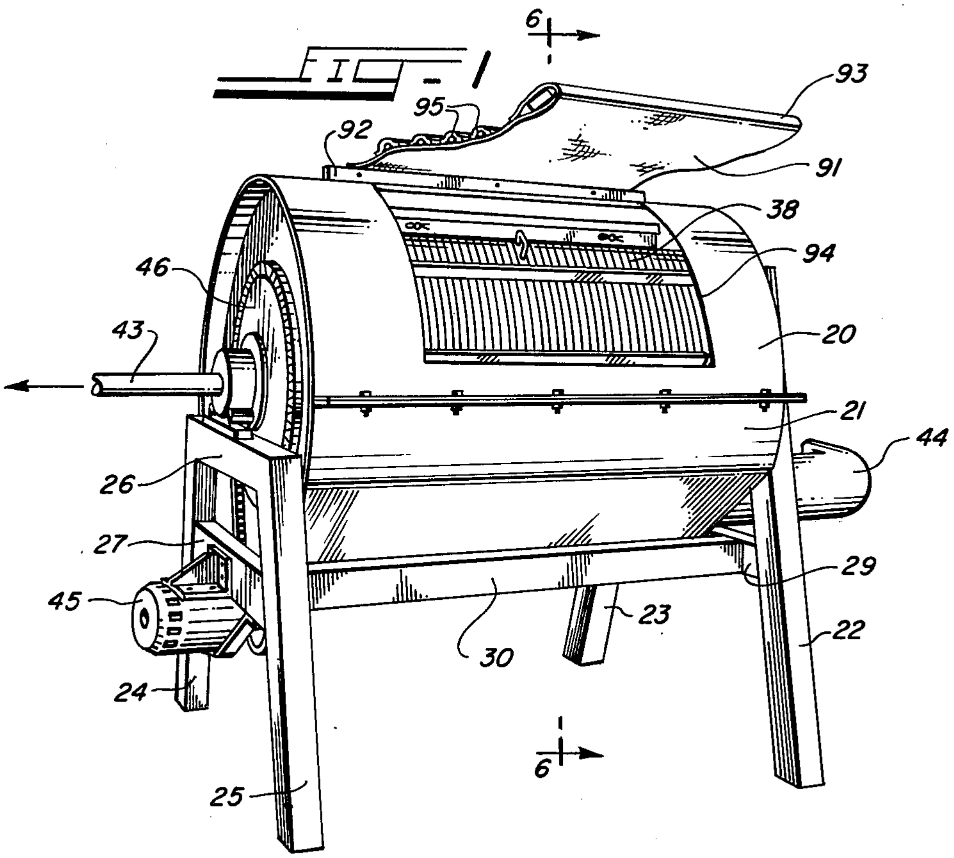
FIG. 1 is a perspective view showing a complete attrition machine incorporating the present inventions, with the curtain cover normally closing the housing opening withdrawn to expose the interior of the machine.
Figure 2:
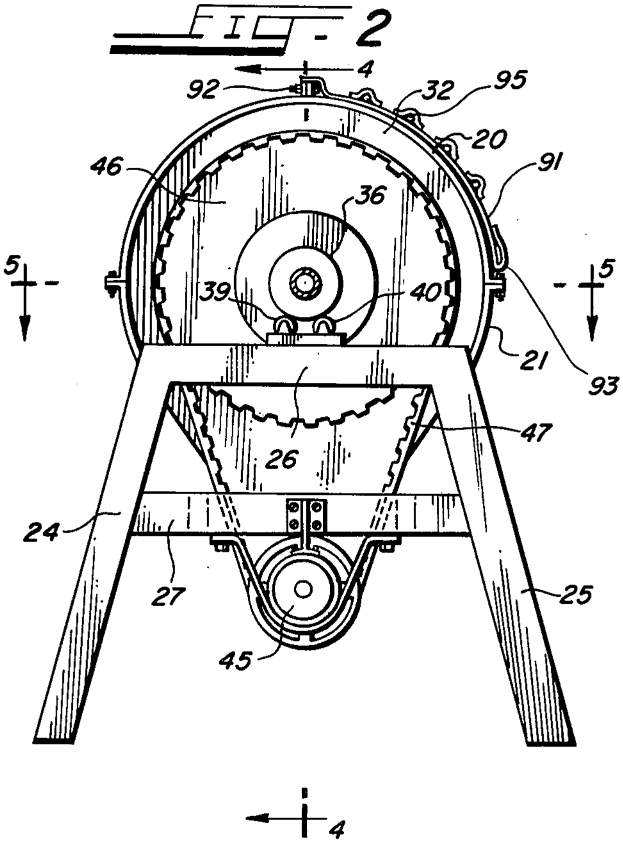
FIG. 2 is an end elevation of the machine illustrated in FIG. 1.
Figure 3:
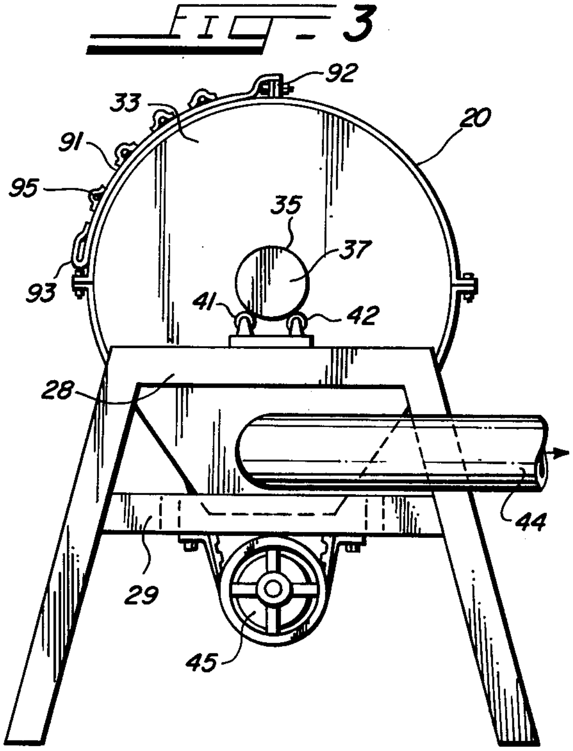
FIG. 3 is an elevation of the opposite end of the machine shown in FIG. 1.
Figure 4:
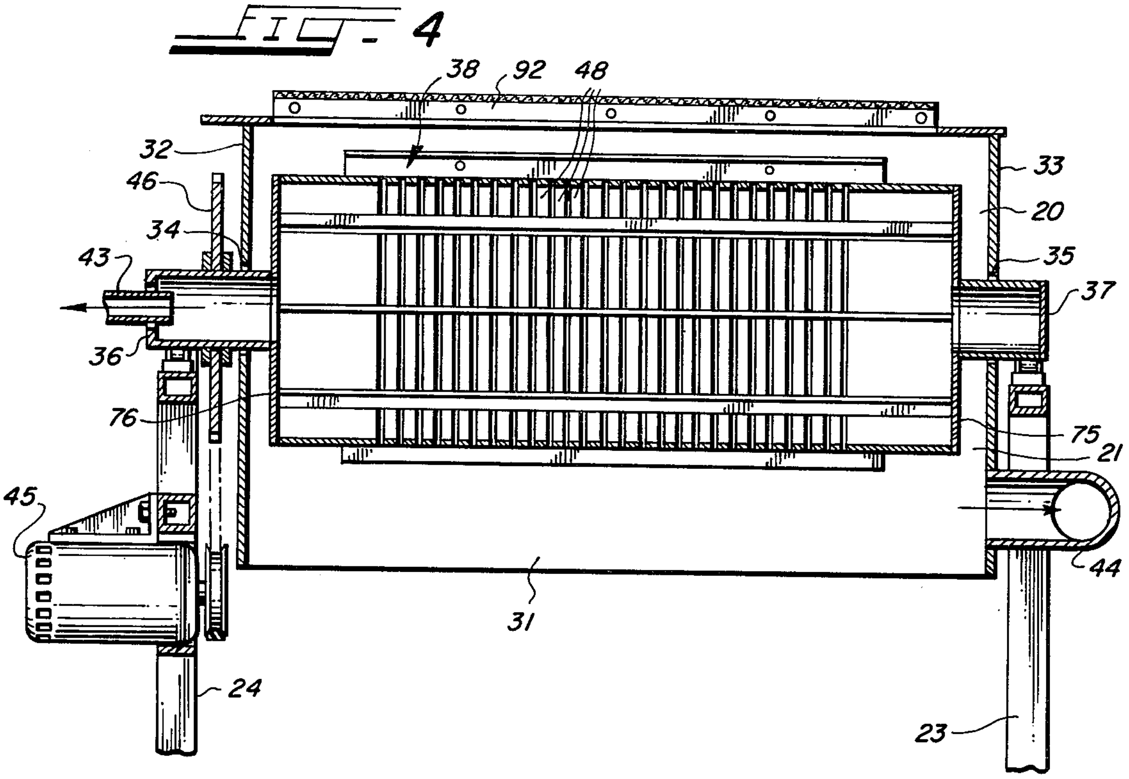
FIG. 4 is a sectional elevation on the plane 4—4 of FIG. 2.
Figure 5:
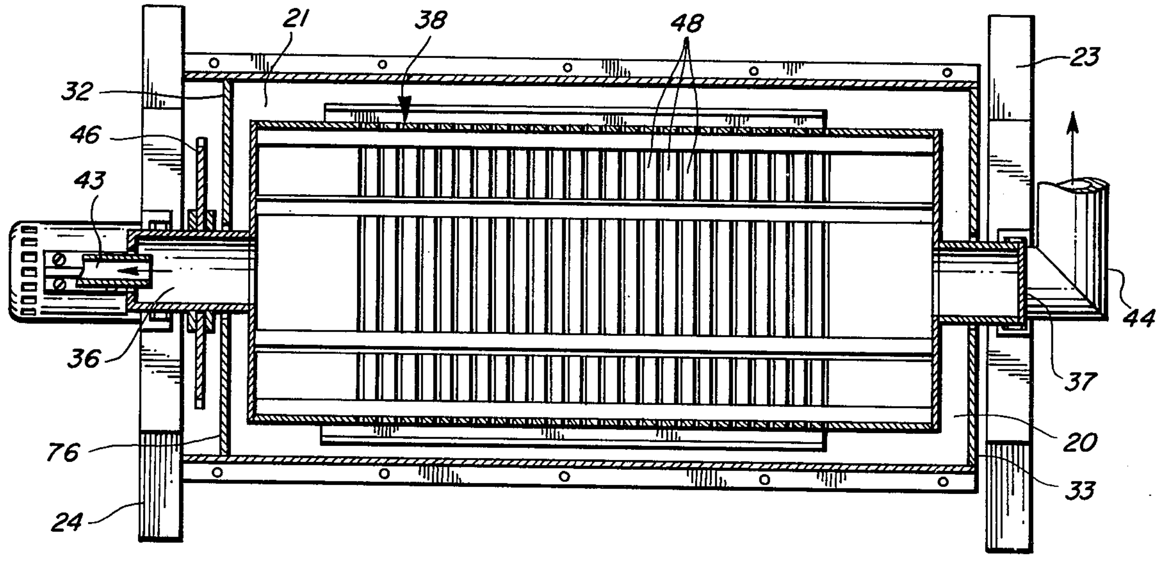
FIG. 5 is a plan view in section on the plane 5—5 of FIG. 2.

Referring to FIGS. 1, 2, and 3, the illustrated machine has a housing formed by the upper and lower components 20 and 21 secured to a stand structure defined by the legs 22–25, the horizontal end members 26–29, and spaced interconnecting beams 30 and 31. The spacing between these beams forms a dump chute for discharge of the fine particles produced by the attrition machine into an open-topped container or box inserted between the legs of the stand. The housing is provided with end-closure plates 32 and 33 having openings as shown at 34 and 35 for receiving the tubular shaft projections 36 and 37, respectively, supporting the rotating grate assembly generally indicated at 38. These shaft projections rest on pairs of trunnion bearings as shown at 39–40 supported on the horizontal beam 26, and 41–42 on the opposite beam 28. The shaft projection 36 is partially closed, and has a central opening receiving the exhaust duct 43 in relatively rotative interengagement. Since there is usually a close fit between a collecting container installed underneath the machine with the bottom of the housing, an intake duct for admission of ventilating air is provided at 44. The ventilation system is primarily for the removal of dust that would otherwise contaminate the room in which the machine was functioning. Rotation of the grate 38 is induced by the action of the motor 45 driving the sprocket 46, secured to the shaft extension 36, with the chain 47. The motor is solidly mounted on the lower horizontal beam 27, or to any other convenient structure associated with the stand.

Figure 7:
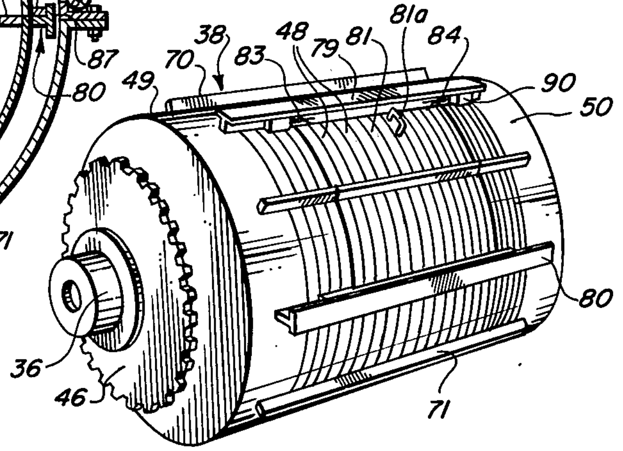
FIG. 7 is a perspective view of the complete rotatable grate component, with the cover in position.
Figure 8:
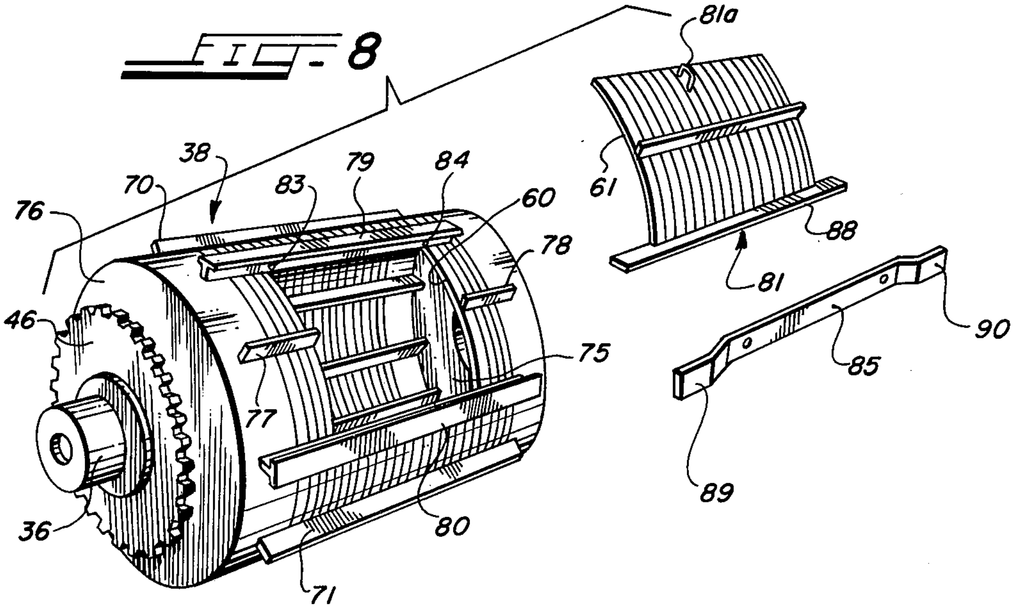
FIG. 8 is an exploded view showing the grate structure of FIG. 7, with the cover removed.
Figure 9:
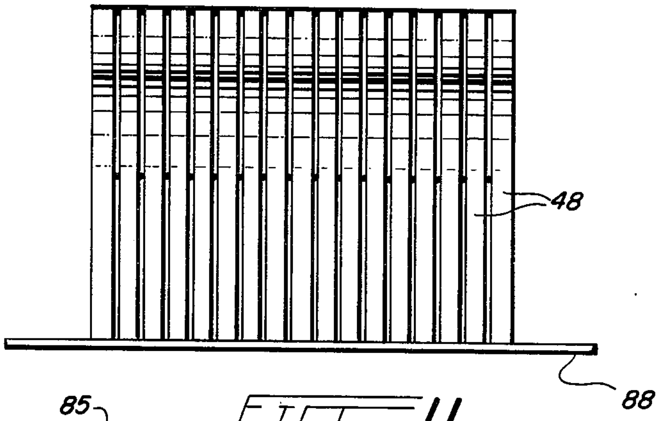
FIG. 9 is a front elevation of the cover unit.
Figure 10:
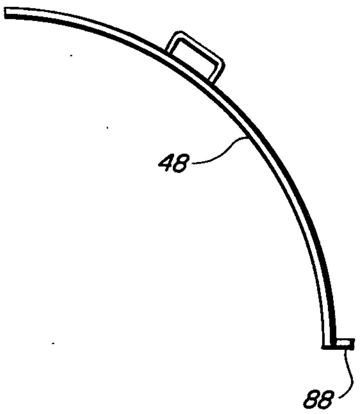
FIG. 10 is a side elevation of the cover.
Figure 11:
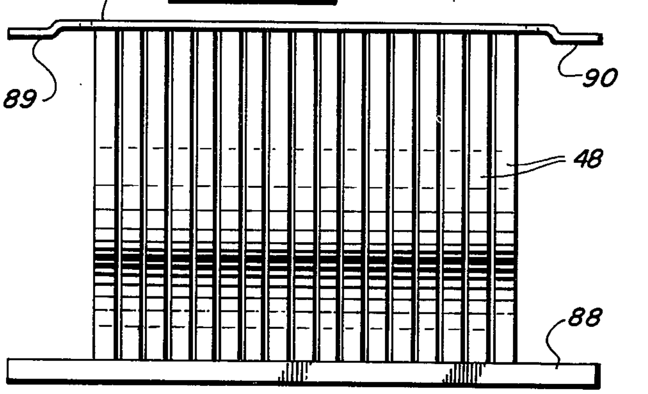
FIG. 11 is a top view of the cover.
Figure 13:
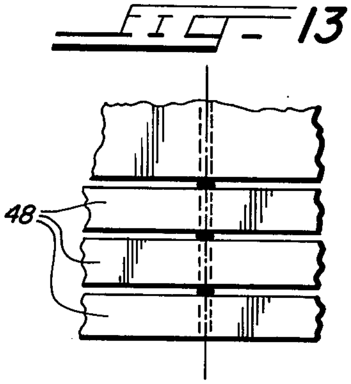
FIG. 13 is an enlarged view of a portion of FIG. 12, illustrating the welding securing the bars together.
Figure 12:
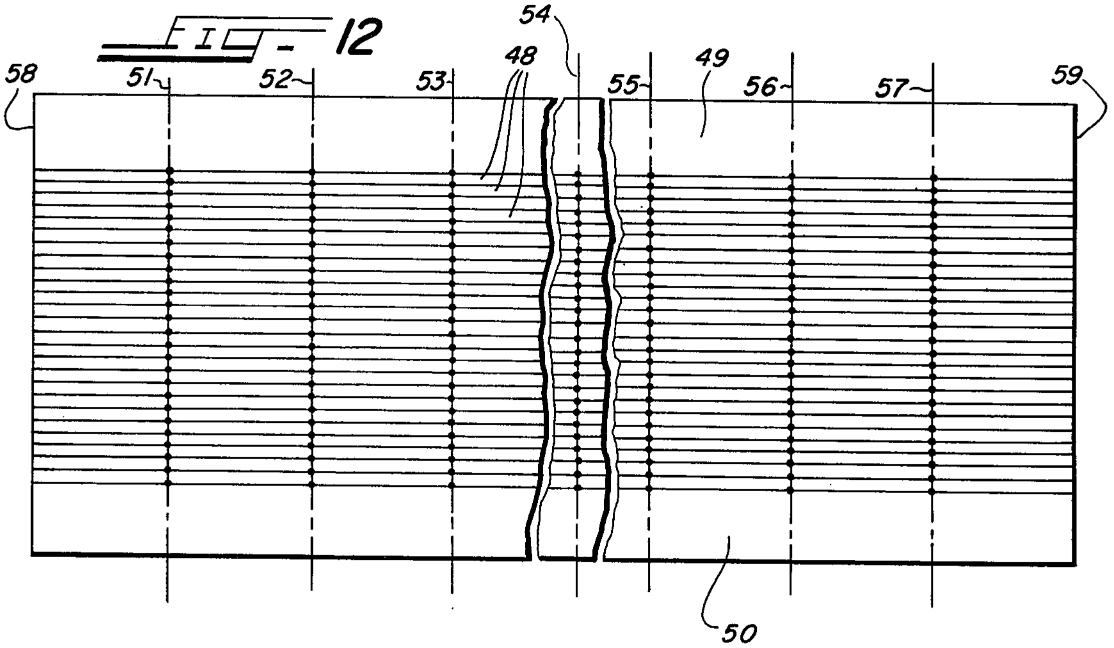
FIG. 12 is a view of the initial stage in the fabrication of the grate, in which the bars are laid out in the flat, and welded.

The structural details of the rotating grate 38 are best shown in FIGS. 7 and 8. The construction of this component begins, as shown in FIG. 12, by laying out a group of straight steel bars 48 side-by-side on a flat surface, separated from each other by approximately one-sixteenth to one-eighth of an inch, depending upon the particle size that the resulting grate is expected to pass. If desired, wider plates as indicated at 49 and 50 are placed along the opposite edges of the assembly. So-called "tack" welds are then applied between these bars and the end members along the transverse lines indicated at 51–57. These welds are preferably an inch or two in length. The distance between the transverse alignment lines 51–57 can conveniently be established at from six inches to a foot, on the average, for a drum on the order of three feet in diameter and four feet long. The cross section of the bars is preferably on the order of one-half inch in thickness (radial direction) by two inches in width (axial direction). Greater thickness tends to invite clogging, and this preferred width provides some degree of lateral resilience that also tends to permit lodged particles to work loose, with the end plates 49 and 50 of corresponding thickness and a convenient width. The space between the tack welds produces the perforations permitting the outflow of particles below the predetermined size.

After the unit has been welded up in the flat as outlined above, it is placed in a standard rolling machine, and rolled into a cylindrical configuration. The opposite ends 58 and 59 are then welded together. An opening 60 is cut in the assembly, which will be covered by a door constructed from the material removed to form this opening, which is indicated at 61 in FIG. 8. The axially-extending internal bars 62–69 are then welded in place. These bars have a dual function of acting as reinforcing beams, as well as maintaining the turbulence of the charged particulate material as the grate rotates. The external reinforcing bars 70–74 are then added, and the end plates 75 and 76. Short exterior bars may be added opposite the cut out 60 as shown at 77 and 78.

Figure 6A:
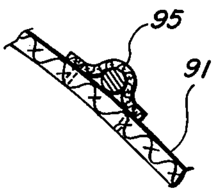
FIG. 6A is an enlarged view of the indicated portion of FIG. 6.
Figure 6:
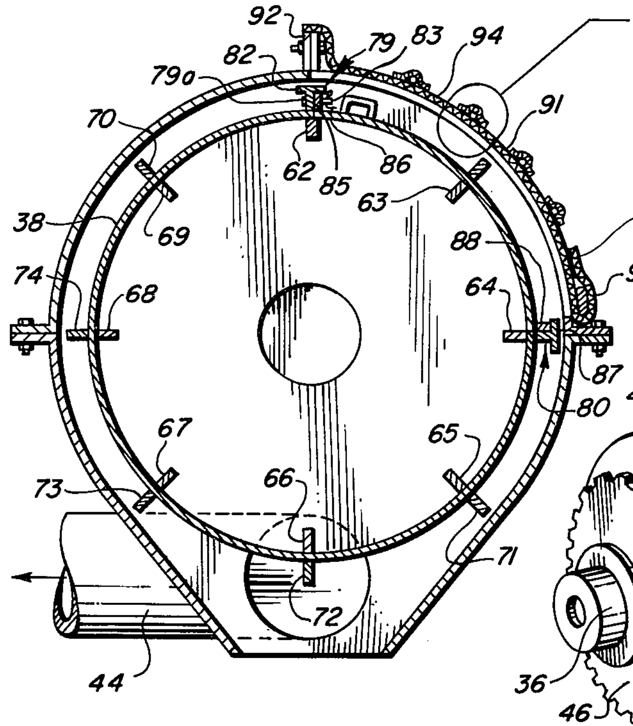
FIG. 6 is a section on the plane 6—6 of FIG. 1.

The reinforcing beams 79 and 80 at the peripherally opposite ends of the cut-out 60 are given a particular configuration to provide for retention of the complete cover unit 81. A radially-extending portion of the beam 79 is indicated at 79*a* which has peripherally-extending flanges 82. One of these flanges overhangs the periphery of the grate in the direction of the opening 60. The radial portion 79*a* is provided with a pair of studs 83–84, which traverse appropriately positioned holes in the locking bar 85. These studs have transverse holes receiving locking pins as shown at 86 in FIG. 6 to maintain the engagement of the bar 85 with the abutment represented by the overhanging ledge 82. The bar holds the adjacent portion of the cover 81 against the shelf provided by the internal bar 62.

At the peripherally opposite side of the cover opening, the beam 80 has a peripherally-extending flange 87 overhanging the opening 60, and receiving the radially-extending flange 88 of the cover, which is a bar welded to the cover pieces 61. The flange 88 of the cover extends axially beyond the cut-out 60, and therefore prevents the adjacent portion of the cover from falling inward. Removal of the locking bar 85 permits the cover to be rotated about its opposite end, clearing the flange 82. Under some circumstances, it may be necessary to apply a little additional persuasion to remove the bar 85 from the engagement with the studs 83, and the bar 85 is provided with offsets as shown at 89 and 90 to establish points where the bar 85 is sufficiently spaced from the portion 79*a* of the grate for the insertion of a pry bar. The handle 81*a* is preferable to facilitate the installation and removal of the cover.

The housing opening 94 is preferably covered by a curtain 91 secured at its upper end to the rail 92 mounted on the housing section 20 along the margin of the upper end of the opening 94. The curtain drapes downward over the opening, and is held sufficiently secure by the action of gravity on the weight bar 93. Preferably, the curtain is provided with battens 95 extending parallel to the axis of the grate to resist the effect of reduced air pressure inside the housing. The combined effect of the weight bar 93 and the air pressure differential will normally be sufficient to keep the curtain in place, and eliminate any tendency for dust to be thrown out into the room. In the operation of the machine, a charge of material is thrown into the grate 38 through the opening 60, with the curtain 91 withdrawn or rolled upwardly, after the grate has been placed in a position with the cover 81 in alignment with the housing opening 94, and with the cover removed out through the opening 94. On completion of the charging operation, the cover is replaced, the curtain again lowered over the opening 94, and the machine started by energizing the motor 45. The fine particulate material resulting from the pulverizing process passes through the spaces between the bars of the rotating grate, and drops into a container placed between the legs of the machine. After the material has been sufficiently pulverized so that practically nothing but irreducible material remains, the container can be withdrawn and replaced by another container. The cover of the grate is then removed through the opening 94, and the grate then rotatively indexed around to the point where the opening normally covered by the door 81 faces downward. This results in dumping the remaining material into the second container. The original charge of material is thus separated into pulverizable and non-pulverizable components. This process is particularly useful in salvaging metal from foundry wastes, which often contain high percentages of metal. The slag and sand components are easily pulverized, leaving the metal in relatively large chunks.

I claim:

1. A method of manufacturing a cylindrical grate, comprising:
   arranging a plurality of elongated substantially straight bars in spaced paralled relationship;
   bonding the adjacent of said bars together, said bonding being exclusively by bonding material deposited essentially between the spaced bars at positions spaced in the direction of the length of said bars;

forming the resulting bonded assembly of bars into a cylindrical configuration;

bonding the opposite ends of said assembly to form a continuous cylindrical structure; and at least partially closing the ends of said cylindrical structure.

2. A method as defined in claim 1, wherein said bonding is performed by welding.

3. A method as defined in claim 1, additionally including the step of cutting out an area of said cylindrical configuration to form an opening and a cover for said opening.

4. A method as defined in claim 1, additionally including the step of securing reinforcing bars to said cylindrical configuration parallel to the axis thereof.

* * * * *